(12) United States Patent
Ishida

(10) Patent No.: US 8,746,948 B2
(45) Date of Patent: Jun. 10, 2014

(54) LIGHT GUIDE, DOCUMENT ILLUMINATING DEVICE, IMAGE READING DEVICE, AND IMAGE FORMING APPARATUS

(75) Inventor: Masatoshi Ishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 234 days.

(21) Appl. No.: 13/456,864

(22) Filed: Apr. 26, 2012

(65) Prior Publication Data

US 2012/0300271 A1 Nov. 29, 2012

(30) Foreign Application Priority Data

May 27, 2011 (JP) ................ 2011-119418

(51) Int. Cl.
*H04N 1/04* (2006.01)
*H04N 1/00* (2006.01)

(52) U.S. Cl.
CPC .............. *G02B 6/0046* (2013.01); *H04N 1/001* (2013.01); *H04N 1/00254* (2013.01)
USPC ........................................ 362/613; 362/625

(58) Field of Classification Search
CPC ... G02B 6/0046; H04N 1/001; H04N 1/00254
USPC .................... 362/602, 613, 616, 625
See application file for complete search history.

(56) References Cited

U.S. PATENT DOCUMENTS

| | | | |
|---|---|---|---|
| 2010/0124439 A1* | 5/2010 | Suto et al. .................. | 362/613 |
| 2010/0232834 A1 | 9/2010 | Ishida | |

FOREIGN PATENT DOCUMENTS

| | | |
|---|---|---|
| CN | 101742042 A | 6/2010 |
| EP | 1 615 418 A1 | 1/2006 |
| JP | 3-219761 | 9/1991 |
| JP | 2006-25303 | 1/2006 |
| JP | 2007-5860 A | 1/2007 |
| JP | 2008-35036 | 2/2008 |
| JP | 2010-136348 | 6/2010 |
| JP | 2010-178354 | 8/2010 |
| JP | 4579816 B2 | 11/2010 |
| JP | 2011-91652 | 5/2011 |

OTHER PUBLICATIONS

Combined Office Action and Search Report issued Dec. 24, 2013 in Chinese Patent Application No. 201210162323.1 with English translation of categories of cited documents.

* cited by examiner

*Primary Examiner* — David V Bruce
(74) *Attorney, Agent, or Firm* — Oblon, Spivak, McClelland, Maier & Neustadt, L.L.P.

(57) ABSTRACT

A light guide for guiding light from multiple point sources arranged in a first direction (Y1) on a light source board includes a supporting unit including multiple supporting pieces provided to the light source board, arranged at regular intervals in the first direction (Y1), and a light guiding body continuous with the multiple supporting pieces and disposed downstream from the multiple point sources in a light emission direction (L). The light guiding body includes an incident surface, a light emission surface, multiple support ranges in which the supporting pieces are provided, and multiple light transmission ranges adjacent to the support ranges, respectively, in the first direction (Y1), to cause the light to exit the guiding body partly, and the multiple support ranges and the multiple light transmission ranges have substantially the same length in a second direction (X) perpendicular to the first direction (Y1).

9 Claims, 13 Drawing Sheets

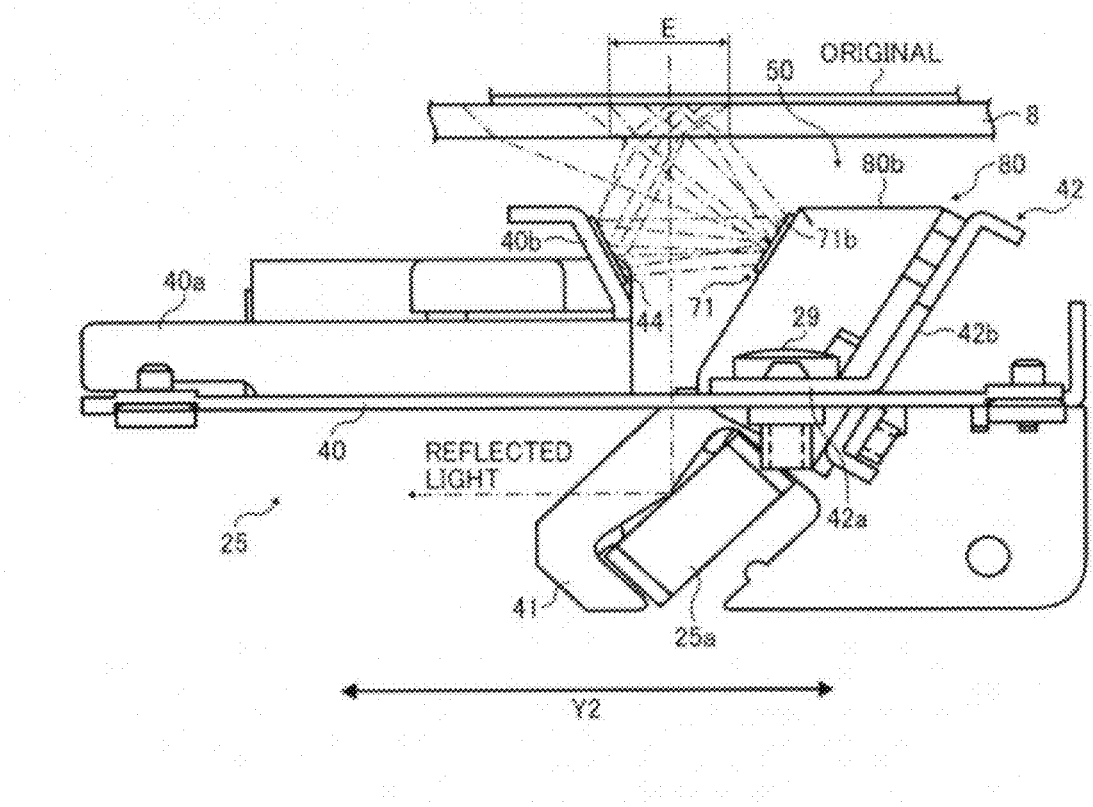

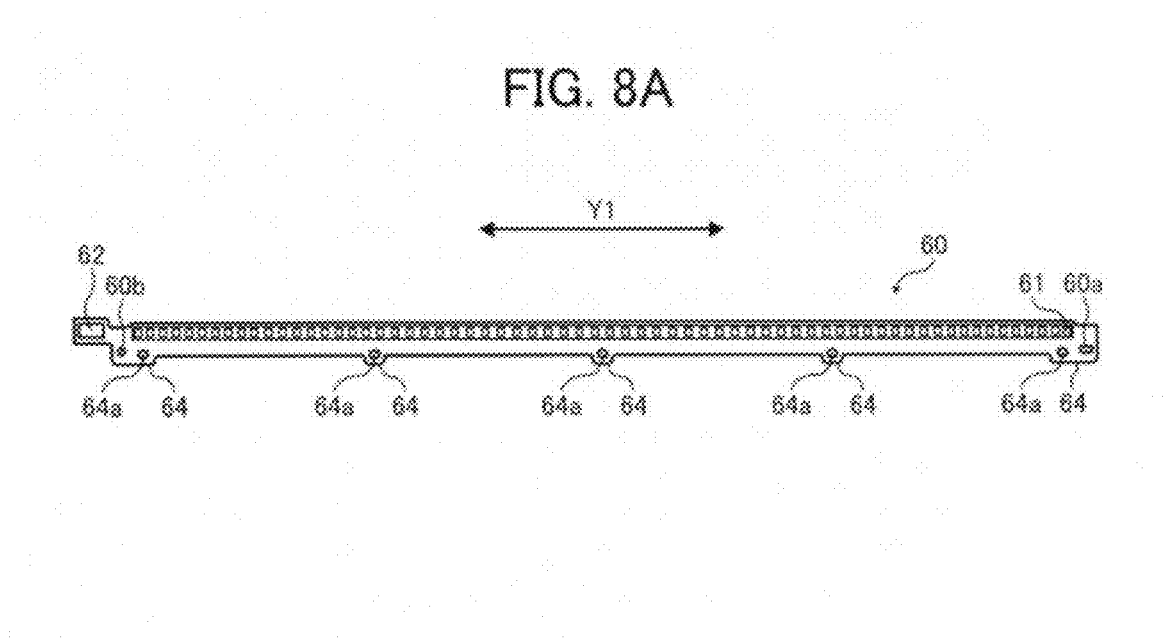
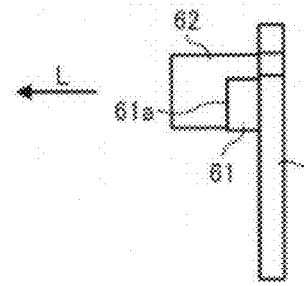

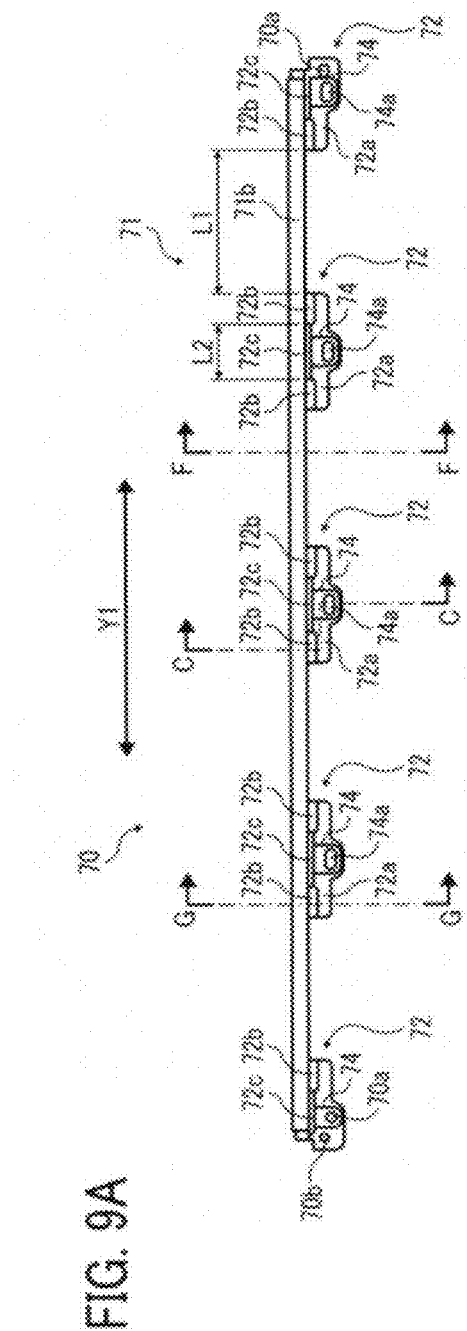
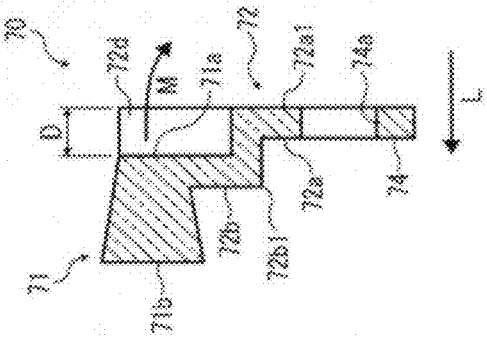
FIG. 9A
FIG. 9B

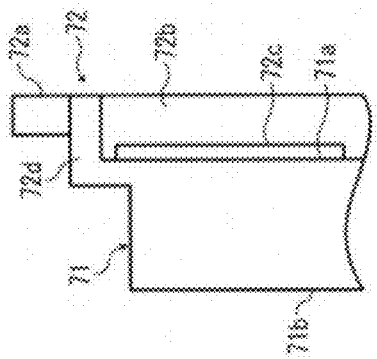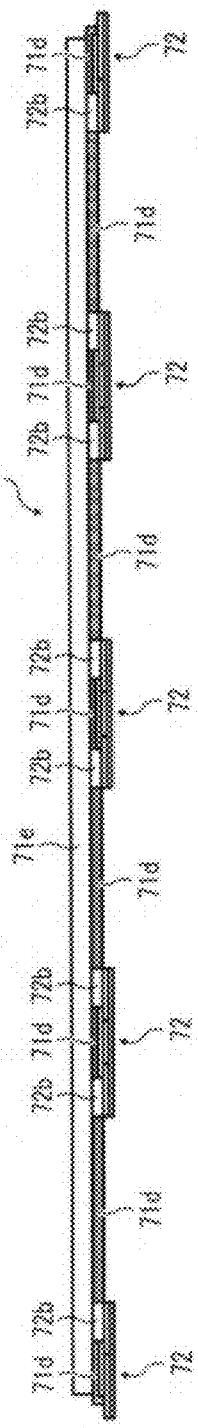

LIGHT GUIDE, DOCUMENT ILLUMINATING DEVICE, IMAGE READING DEVICE, AND IMAGE FORMING APPARATUS

CROSS-REFERENCE TO RELATED APPLICATION

This patent application is based on and claims priority pursuant to 35 U.S.C. §119 to Japanese Patent Application No. 2011-119418, filed on May 27, 2011, in the Japan Patent Office, the entire disclosure of which is hereby incorporated by reference herein.

FIELD OF THE INVENTION

The present invention generally relates to a light guide to guide light emitted from a light source to an object, a document illuminating device, an image reading device, and an image forming apparatus such as a copier, a printer, a plotter, or a multifunction machine including at least two of these functions.

BACKGROUND OF THE INVENTION

Image reading devices used in facsimile machines, copiers, or multifunction image forming apparatuses typically include a document illuminating device to illuminate originals. In document illuminating devices, light-emitting diodes (LEDs), which are point sources, are widely used as light sources in response to the recent need for speeding up the rise time, extending the useful life of the light source, and saving energy.

To function as point sources, LEDs must have a small light-emitting surface. However, lighting systems constructed of only such LEDs having a small light-emitting surface cannot provide a sufficient amount of light, and further the illuminance distribution in a sub-scanning direction is not uniform.

To overcome the above-described difficulties, for example, light guides may be used to guide the light emitted from the LEDs of the document illuminating device. It is necessary to optimize the light sources such as LEDs and the light guide to condense light efficiently and attain uniform illuminance distribution in high-quality image reading devices such as general-purpose scanners or those used in digital or analogue image forming apparatuses such as copiers and multifunction machines capable of either monochrome or multicolor image formation.

For example, JP-2008-035036-A proposes a document illuminating device including multiple LEDs arranged in a main scanning direction, supported on an LED board, and a light guide for guiding the light emitted from the LEDs to an irradiation range of the original. The light guide is also supported by the LED board, and is long in the main scanning direction in which the LEDs are arranged. The light guide includes multiple engagement projections spaced at an interval in the main scanning direction to attach the light guide to the LED board.

The light guide proposed in JP-2008-035036-A, however, has a drawback in that, depending on the presence of the engagement projection of the light guide, it is possible that the intensity of light emitted from the light guide fluctuates in the main scanning direction. More specifically, in the area where the engagement projection is formed, the light emitted from the LED partly passes through the engagement projection of the light guide and is deflected from the irradiation area of the original. By contrast, in the area where the engagement projection is not formed, all the light emitted from the LED can be internally reflected totally (total internal reflection) and directed to the irradiation area of the original.

BRIEF SUMMARY OF THE INVENTION

In view of the foregoing, one embodiment of the present invention provides a light guide for guiding light toward an irradiation range from multiple point sources arranged in a first direction and held by a light source board. The light guide includes a light guiding body disposed downstream from the multiple point sources in a light emission direction of the light emitted from the multiple point sources, and a supporting unit continuous with the light guiding body to support the light guiding body. The supporting unit includes multiple supporting pieces provided to the light source board and arranged at regular intervals in the first direction. The light guiding body includes an incident surface disposed facing an irradiation surface of the point source, a light emission surface from which the light is directed to the irradiation range, multiple support ranges in which the multiple supporting pieces are provided, and multiple light transmission ranges to cause the light emitted from the multiple point sources to exit the guiding body partly. Each light transmission range is adjacent to a respective one of the multiple support ranges in the first direction. The multiple support ranges and the multiple light transmission ranges are similar in length in a second direction perpendicular to the first direction.

Another embodiment provides a document illuminating device to illuminate an irradiation range of an original. The document illuminating device includes multiple point sources arranged in a first direction, a light source board to hold the multiple point sources, and the light guide described above.

In yet another embodiment, an image reading device includes the document illuminating device described above, and an image reading unit to receive light reflected from the irradiation range of an original and read image data of the original.

In yet another embodiment, an image forming apparatus includes the image reading device described above, and an image forming unit to form an image on a recording medium according to the image data acquired by the image reading device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a side view of the first carriage incorporating the document illuminating device according to the embodiment;

FIG. 8A is a front view of an LED board as viewed from the front side in the direction in which the LED emits light;

FIG. 8B is a side view of the LED board shown in FIG. 8A;

FIG. 9A is a front view of a light guide according to an embodiment, as viewed from the front side in the direction in which the LED emits light;

FIG. 9B is a cross sectional view of the light guide shown in FIG. 9A along a line C-C;

FIG. 10 is an enlarged plan view of the light guide shown in FIG. 9A;

FIG. 11 illustrates the light guide as viewed from below in FIG. 9B;

DETAILED DESCRIPTION OF THE INVENTION

Figure 1:
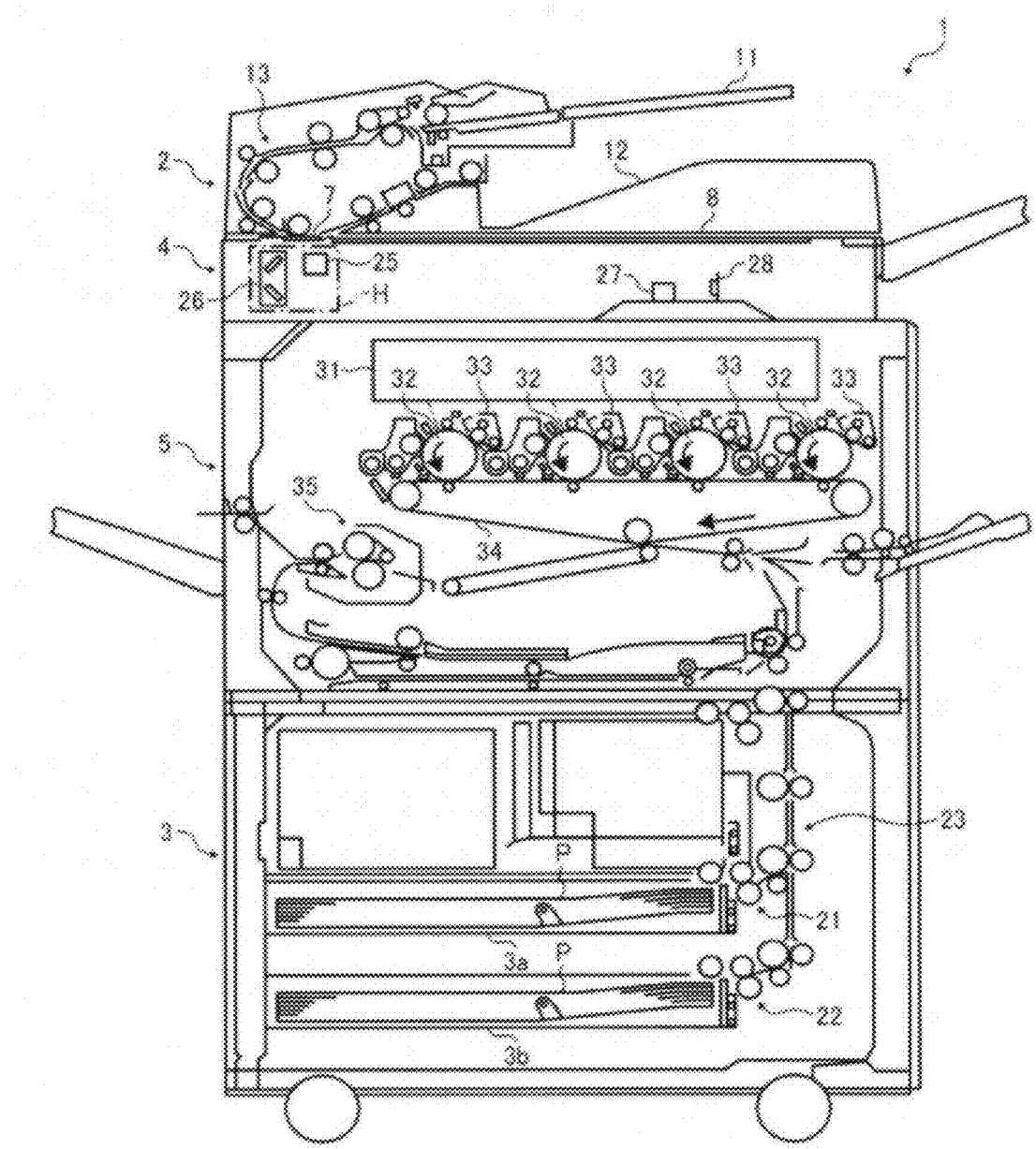
FIG. 1 is a schematic view of an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus incorporating a document illuminating device according to an embodiment of the present invention is described.

FIG. 1 is a schematic view of an image forming apparatus 1 that in the present embodiment is an electrophotographic copier.

The image forming apparatus 1 can form multicolor or single-color images using a typical electrostatic image forming method. It is to be noted that, although the configuration shown in FIG. 1 concerns electrophotographic image forming methods, alternatively, ink-ejecting printing methods may be used instead.

Referring to FIG. 1, the image forming apparatus 1 includes an automatic document feeder (ADF) 2, a sheet feeding unit 3, an image reading unit 4, and an image forming unit 5.

The ADF 2 includes a document table 11, and a conveyance unit 13 including multiple rollers and the like. The conveyance unit 13 of the ADF 2 transports originals placed on the document table 11 to a reading position above a slit glass 7. After the image reading unit 4 scans the original through the slit glass 7, the conveyance unit 13 transports the original to a discharge tray 12. The ADF 2 is hinged to the image reading unit 4 and can be lifted to open relative to the image reading unit 4.

The sheet feeder 3 includes sheet cassettes 3a and 3b for storing different size sheets P of recording media, pick-up devices 21 and 22 to pick up and send out the sheets P from the sheet cassettes 3a and 3b, and conveyance members 23, such as rollers, to transport the sheets P to a predetermined image formation position in the image forming unit 5.

The image reading unit 4 includes first and second carriages 25 and 26, an imaging lens 27, and an imaging device 28 serving as a reading member. The first carriage 25 includes at least one light source (LED 61 shown in FIG. 6) and a first mirror 25a (shown in FIG. 2), and the second carriage 26 includes second and third mirrors 26a and 26b (shown in FIG. 2).

To read image data of originals transported by the ADF 2, the image reading unit 4 moves the first and second carriages 25 and 26 to the position indicated by broken rectangle H shown in FIG. 1, immediately beneath the slit glass 7. The original passing above the slit glass 7 is illuminated by the light source of the first carriage 25, and the light reflected from the surface of the original is further reflected by the mirrors of the first and second carriages 25 and 26. The reflected light is imaged by the imaging lens 27 and read by the imaging device 28.

By contrast, to read image data of an original placed on an exposure glass 8, the first and second carriages 25 and 26 are moved in the lateral direction in FIG. 1 (sub-scanning direction). While the first and second carriages 25 and 26 are thus moved, the light emitted from the light source is reflected from the surface of the original and further reflected by the mirrors of the first and second carriages 25 and 26. The reflected light is imaged by the imaging lens 27 and read by the imaging device 28.

The image forming unit 5 includes an exposure unit 31, multiple photoreceptor drums 32, development devices 33, a transfer belt 34, and a fixing device 35. The development devices 33 contain different color toners, namely, cyan, magenta, yellow, and black toners. In the image forming unit 5, the exposure unit 31 exposes the respective photoreceptor drums 32 according to the image data read by the image reading unit 4, thus forming latent images on the respective photoreceptor drums 32. Then, the development devices 33 develop the latent images on the respective photoreceptor drums 32 into toner images with different color toners. The toner images are then transferred from the photoreceptor drums 32 via the transfer belt 34 onto the sheet P fed by the sheet feeding unit 3, after which the fixing device 35 fuses and fixes the toner image on the sheet P. Thus, a multicolor toner image is formed on the sheet P.

Next, the image reading unit 4 is described in further detail below with reference to FIG. 2, which is a schematic side view of the image reading unit 4. It is to be noted that arrow Y2 shown in FIG. 2 indicates the sub-scanning direction.

Figure 2:
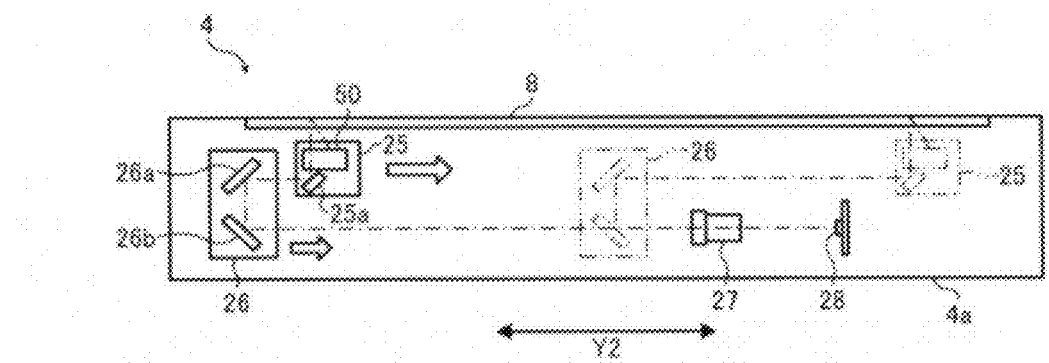
FIG. 2 is a schematic side view of an image reading unit according to an embodiment of the present invention.

As shown in FIG. 2, the components of the image reading unit 4, namely, the first and second carriages 25 and 26, the imaging lens 27, and the imaging device 28, are disposed inside a frame 4a of the image reading unit 4. Additionally, two pairs of rails (first and second rails) extending in the lateral direction in FIG. 2, which is the sub-scanning direction indicated by arrow Y2 (hereinafter "sub-scanning direction Y2"), are provided in the frame 4a. The first rails are arranged at a predetermined interval in the main scanning direction indicated by arrow Y1 shown in FIG. 3 (hereinafter "main scanning direction Y1") perpendicular to the sub-scanning direction Y2. Similarly, the second rails are arranged at a predetermined interval in the main scanning direction Y1.

The first carriage 25 is attached to the first rails slidably in the sub-scanning direction Y2 and can reciprocate between the position indicated by solid lines and the position indicated by broken lines shown in FIG. 2 via a first carriage driving wire, driven by a driving motor. The first carriage 26 is attached to the second rails slidably in the sub-scanning direction Y2 and can reciprocate between the position indicated by solid lines and the position indicated by broken lines shown in FIG. 2 via a second carriage driving wire, driven by a driving motor. The ratio of the velocity of the first carriage 25 to that of the second carriage 26 is 2:1 to eliminate or reduce fluctuations in the optical path length from the surface of the original to the imaging lens 27 even if the first and second carriages 25 and 26 move.

In the first carriage 25, a document illuminating device 50 and the first mirror 25a are provided. In the second carriage 26, the second and third mirrors 26a and 26b are provided.

The imaging lens 27 is configured to condense the light reflected from the original and form an image on the imaging device 28. The imaging device 28 includes imaging elements such as charge-coupled devices (CCDs) and outputs analogue image signals generated through photoelectric conversion of the light reflected from the original and imaged via the imaging lens 27.

The first carriage 25 is described in further detail below with reference to FIGS. 3 through 5B.

Figure 3:
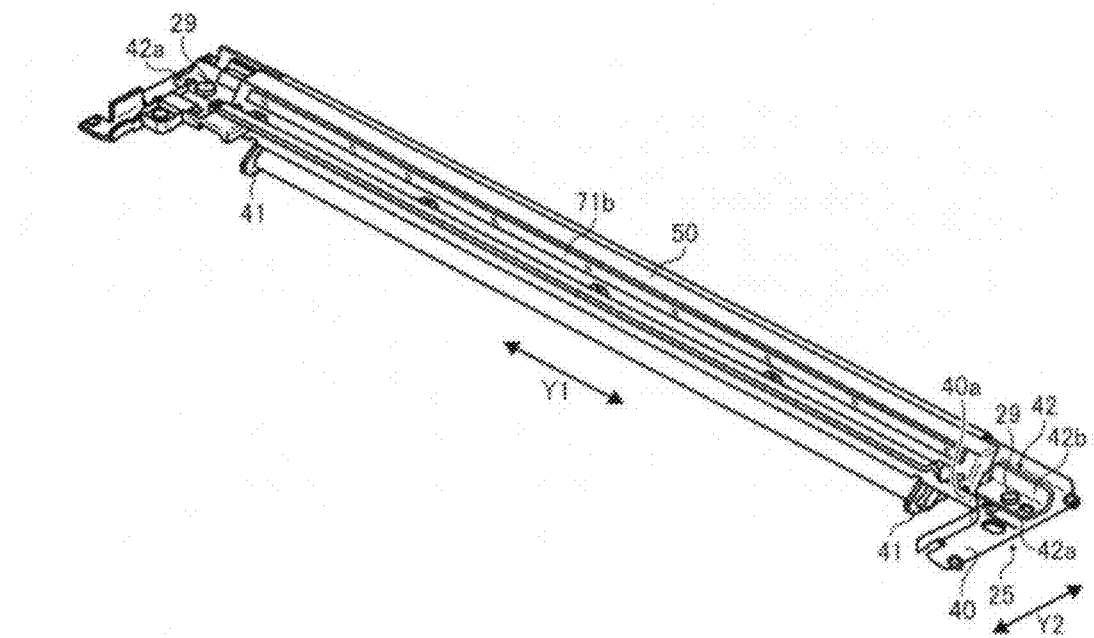
FIG. 3 is a perspective view of a first carriage incorporating a document illuminating device according to an embodiment.
Figure 5A:
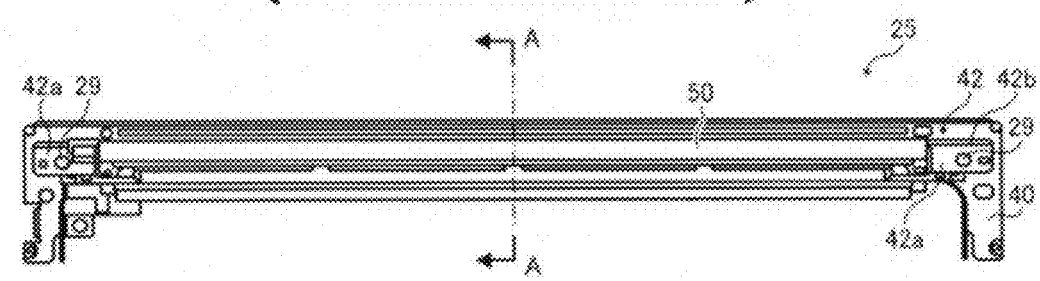
FIG. 5A is a plan view of the first carriage incorporating the document illuminating device shown in FIG. 3.
Figure 5B:
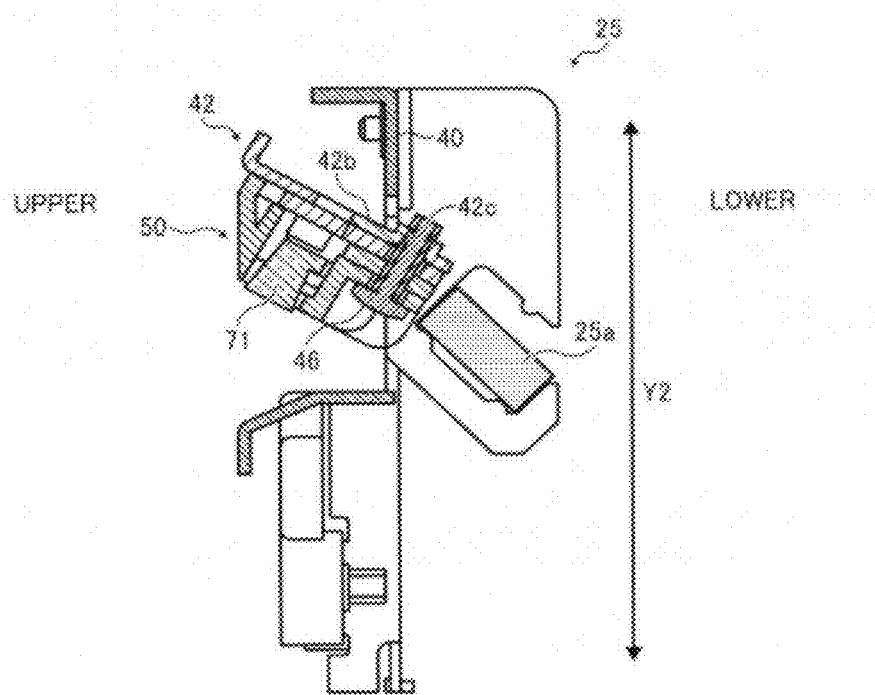
FIG. 5B illustrates a cross-sectional view of the first carriage incorporating the document illuminating device shown in FIG. 5A along a line A-A.

FIGS. 3, 4, and 5A are respectively a perspective view, a side view, and a plan view of the first carriage 25 incorporating the document illuminating device 50. FIG. 5B illustrates an A-A cross-section shown in FIG. 5A.

As shown in FIGS. 3 and 4, the first carriage 25 includes a base 40 constructed of a metal sheet, a pair of side plates 41 handing beneath the base 40, and a receiving table 42 fixed to an upper face of the base 40 with connectors 29. To the receiving table 42, the document illuminating device 50 is connected.

The base 40 includes a front rim 40a (on the left in FIG. 4) forming a flange folded upward, and an inclined portion 40b is provided at a predetermined portion of an upper end portion of the front rim 40a. The inclined portion 40b is folded to be inclined relative to the base 40 by a predetermined angle. In other words, the inclined portion 40b is disposed in a predetermined range facing the document illuminating device 50 in the main scanning direction Y1 (shown in FIG. 3). Additionally, a so-called reflector 44 is provided to the inclined portion 40b to reflect the light emitted from the document illuminating device 50 to have a desired illuminance distribution on the surface of the original. The reflector 44 can eliminate shadows caused by surface unevenness of, for example, originals containing clippings bonded thereto, by reflecting the light emitted from the document illuminating device 50.

The pair of side plates 41 are disposed at an interval in the main scanning direction Y1 and designed to hold the first mirror 25a that is long in the main scanning direction Y1.

The receiving table 42 is constructed of, for example, a metal sheet, and includes attachment portions 42a each having a face to be attached to the base 40 and a folded portion 42b folded upward to have a predetermined inclination relative to the attachment portion 42a. As shown in FIG. 5A, the attachment portions 42a are provided in both end portions of the receiving table 42 in the main scanning direction Y1 (lateral direction in FIG. 5A) and connected to the base 40 with the connectors 29.

The folded portion 42b extends in the main scanning direction Y1 and, as shown in FIG. 5B, extends beneath the base 40 except the portions continuous with the attachment portions 42a. That is, in the folded portion 42b, only the range where the document illuminating device 50 is attached extends beneath the base 40. It is to be noted that the sub-scanning direction Y2 is in the vertical direction in FIG. 5B, and the upper side and the lower side of the first carriage 25 are on the left and the right in FIG. 5B, respectively.

Additionally, multiple screw holes 42c into which screws 46 are screwed are formed beneath the folded portion 42b (on the right of the folded portion 42b in FIG. 5B). The screws 46 are used to attach the document illuminating device 50 to the folded portion 42b. The multiple screw holes 42c are spaced at regular intervals in the main scanning direction Y1. For example, five screw holes 42c are formed in the present embodiment. Additionally, the inclination of the folded portion 42b is such an angle that, when the document illuminating device 50 is attached to the folded portion 42b, illuminance distribution of the light emitted from a light guiding body 71 (shown in FIG. 4) of a light guide 70 can be proper.

It is to be noted that reference character 71b shown in FIG. 3 represents a light emission surface of the light guiding body 71, and, in FIG. 4, reference character E represents an irradiation area, 80 represents a cover, and 80b represents a positioning hole.

Figure 6:
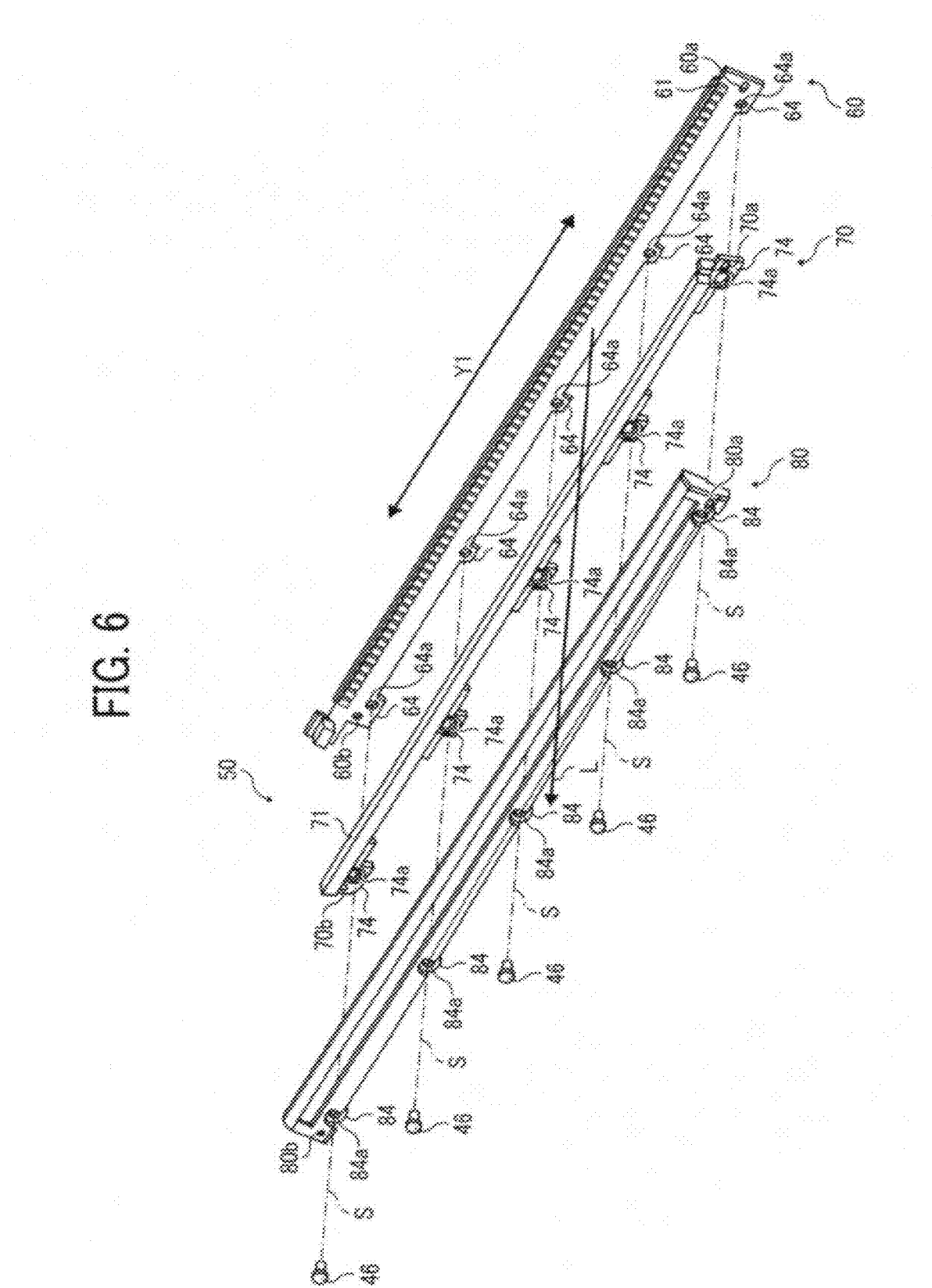
FIG. 6 is an exploded perspective view of the document illuminating device according to the embodiment.
Figure 7A:
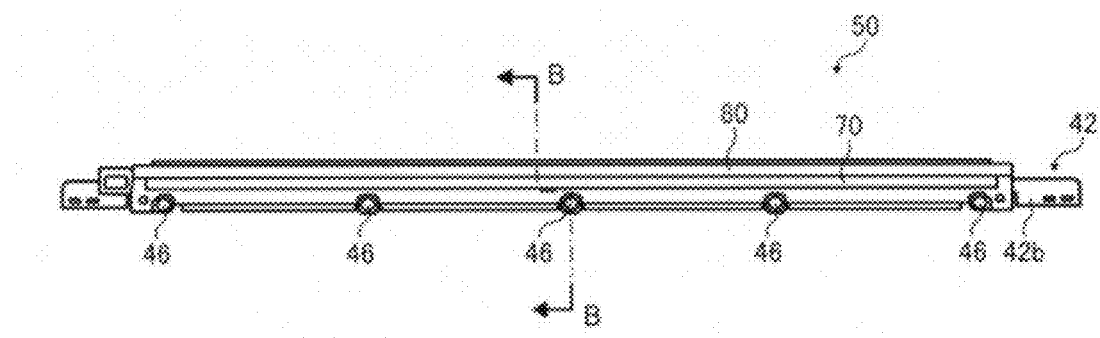
FIG. 7A is a front view of the document illuminating device as viewed from a front side in the direction in which a light-emitting diode (LED) emits light.
Figure 7B:
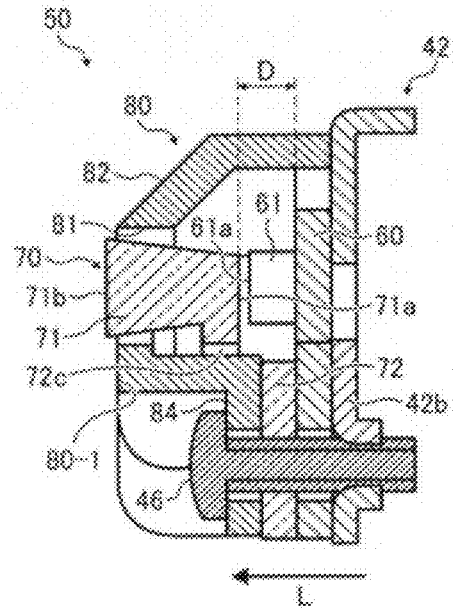
FIG. 7B is a cross sectional view of the document illuminating device shown in FIG. 7A along a line B-B.

Referring to FIGS. 6, 7A, and 7B, the document illuminating device 50 is described below.

FIG. 6 is an exploded perspective view of the document illuminating device 50. FIG. 7A is a front view of the document illuminating device 50 as viewed from a front side in the direction in which the LEDs 61 emit light, and FIG. 7B illustrates a cross section along line B-B shown in FIG. 7A.

The document illuminating device 50 includes an LED board 60, the light guide 70, and the cover 80. The LED board 60, the light guide 70, and the cover 80 are connected together into a single unit with common connectors, that is, the screws 46. It is to be noted that reference character L shown in FIG. 6 represents a direction in which the intensity of light emitted from the LEDs 61 is strongest (hereinafter "light emission direction L"), and the light emission direction L is perpendicular to an irradiation surface 61a of the LED 61 including the main scanning direction Y1.

The LED board 60 is described below.

FIG. 8A is a front view of the LED board 60 as viewed from the front side in the direction in which the LED 61 emits light, and FIG. 8B is a side view of the LED board 60.

As shown in FIG. 6, multiple LEDs 61 are arranged linearly in the main scanning direction Y1 serving as a first direction (extending laterally in FIG. 8A) on the LED board 60. For example, the LEDs 61 can be top-view type. Additionally, wiring patterns to supply power to the respective LEDs 61 and various types of circuit components are formed on the LED board 60. The LED board 60 further includes a connection terminal 62 (shown in FIG. 8A) disposed in an end portion in the main scanning direction Y1 to connect the LED board 60 electrically to a controller. In the present embodiment, the LEDs 61 serve as point sources, and the LED board 60 serves as a light source board.

As shown in FIGS. 6 and 7B, the irradiation surface 61a of the LED 61 is parallel to a face on which the components are implemented (i.e., an implementation face) of the LED board 60, and the LED 61 is configured to emit light from the irradiation surface 61a to the left in FIG. 7B toward the light guide 70, driven by the LED board 60.

Further, as shown in FIG. 6, five first jointing portions 64 are provided to a lower end portion of the LED board 60. The first jointing portions 64 are spaced at substantially regular intervals in the main scanning direction Y1. A part of each first jointing portion 64 projects downward from a lower end of the LED board 60 (also shown in FIG. 8A). A fastening hole 64a into which the screw 46 is inserted is formed in each first jointing portion 64.

Additionally, positioning holes 60a and 60b are formed in the respective end portions of the LED board 60 in the main scanning direction Y1 as shown in FIG. 6. In assembling of the document illuminating device 50, the positioning holes 60a and 60b are fitted around projections of an assembly jig to determine the position of the LED board 60.

It is to be noted that, in FIG. 7B, reference characters 80-1 represents a front surface of the cover 80, 81 represents an opening formed in the cover 80, 82 represents an inclined surface inclined relative to the front surface 80-1 of the cover 80, 84 represents a third jointing portion, D represents a predetermined clearance, and 72c represents cutouts formed in the supporting pieces 72.

Next, the light guide 70 is described below with reference to FIGS. 6, 7B, 9A, and 9B. FIG. 9A is a front view of the light guide 70 as viewed from the front side in the light emission direction L, and FIG. 9B illustrates a C-C cross section shown in FIG. 9A.

Referring to FIG. 7B, the light guide 70 is supported by the LED board 60 and designed to guide the light emitted from the LEDs 61 to the irradiation area E (shown in FIG. 4) of the surface of the original.

Specifically, as shown in FIGS. 7B, 9A and 9B, the light guide 70 includes the light guiding body 71 on the left in FIG. 9B and multiple supporting pieces 72. The light guiding body 71 and the supporting pieces 72 are formed as a single unit, and the light guiding body 71 is positioned on the front side (downstream side) in the light emission direction L.

The light guiding body 71 includes an incident surface 71a facing the irradiation surface 61a of the LED 61 and the light emission surface 71b. The light from the LED 61 enters the light guiding body 71 from the incident surface 71a and is guided to emit from the light emission surface 71b toward the irradiation area E of the original. The light guiding body 71 is constructed of a material, such as acrylic resin, having a higher degree of light permeability. The light emission surface 71b is abraded or roughened by surface roughening such as sandblasting or etching to diffuse light emitted from the light emission surface 71b.

Additionally, as shown in FIG. 9B, when cut vertically along the light emission direction L, the light guiding body 71 is trapezoidal in cross section perpendicular to the incident surface 71a and parallel to the light emission direction L, and the trapezoidal cross section of the light guiding body 71 is sufficiently long in the light emission direction L, in which the light guiding body 71 guides the light. In other words, the thickness (a vertical length in FIG. 9B) of the light guiding body 71 increases gradually from the incident surface 71a toward the light emission surface 71b, and its upper surface and a lower surface 71L (shown in FIG. 12A) are slightly inclined relative to the light emission direction L.

With this configuration, a substantial part of the light that enters the light guiding body 71 from the incident surface 71a and reaches the upper surface and the lower surface in FIG. 9B does not pass through the light guiding body 71 but can be reflected internally. Accordingly, a greater amount of light can be totally reflected back internally and caused to exit from the light emission surface 71b. Therefore, the illuminance distribution of light traveling inside the light guiding body 71 can be adjusted suitably while the light is totally reflected internally.

Figure 14A:
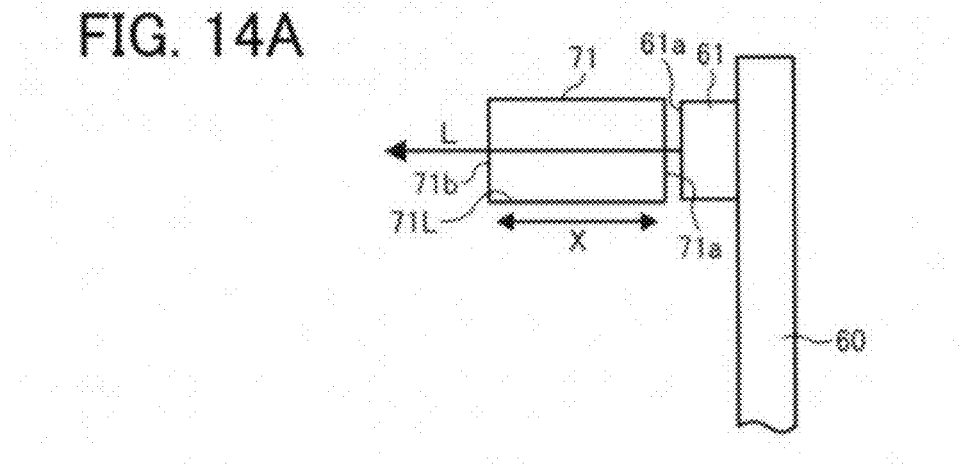
FIGS. 14A, 14B, and 14C illustrate variations in the shape of the light guide shown in FIG. 13.

The shape of the light guiding body 71 is not limited to the above-described shape having a trapezoidal cross section but can be any shape suitable for total internal reflection. For example, as shown in FIG. 14A, the light guiding body 71 may be a substantially rectangular parallelepiped that is low profile and extends in the main scanning direction Y1 (lateral direction in FIG. 9A).

Similarly to the light guiding body 71, the supporting piece 72 can be constructed of resin such as acrylic resin. Multiple (five in the present embodiment) supporting pieces 72, together forming a supporting unit, are provided at regular intervals in the main scanning direction Y1.

The supporting piece 72 includes a planar portion 72a and one or two support portions 72b disposed between the planar portion 72a and the light guiding body 71. The light guiding body 71, the planar portion 72a, and the support portion 72b are formed as a single unit.

As shown in FIG. 9A, second jointing portions 74 are provided to lower end portions of the respective planar portions 72a. A part of each second jointing portion 74 projects downward from a lower end of the planar portion 72a. As shown in FIG. 6, the second jointing portions 74 are positioned to overlap with the respective first jointing portions 64 of the LED board 60 in the light emission direction L.

Additionally, a fastening hole 74a into which the screw 64 is inserted is formed in each second jointing portion 74 as shown in FIG. 9A. The fastening hole 74a is positioned so that its center is on a virtual line S that is parallel to the light emission direction L and passes though a center of the fastening hole 64a.

Further, positioning holes 70a and 70b are respectively formed in the planar portions 72a of the supporting pieces 72 at both ends in the main scanning direction Y1 among the five supporting pieces 72. In assembling of the document illuminating device 50, the positioning holes 70a and 70b are fitted around the projections of the assembly jig to determine the position of the light guide 70 relative to the LED board 60 (shown in FIG. 6). Naturally, each fastening hole 74a is aligned with the corresponding fastening hole 64a of the LED board 60 (shown in FIG. 6) when the position of the light guide 70 is set by the assembling jig.

Referring to FIGS. 9A and 11, the supporting pieces 72 at the ends in the main scanning direction Y1 include a single support portion 72b, and other three supporting pieces 72 include two support portions 72b spaced in the main scanning direction Y1, respectively. It is to be noted that FIG. 11 illustrates the light guide 70 as viewed from below in FIG. 9B. Thus, multiple support portions 72b are provided at regular intervals (interval L1 or L2 shown in FIG. 9A) in the main scanning direction Y1. However, the interval L1 between the support portions 72b provided to the adjacent different supporting pieces 72 is greater than the interval L2 between a pair of support portions 72b provided to an identical supporting piece 72.

Referring to FIG. 9B, the support portion 72b is bent at an upper end of the planar portion 72a in the light emission direction L and again bent at a leading edge 72b1 in the light emission direction L to the direction parallel to the incident surface 71a of the light guiding body 71. Thus, the support portion 72b is L-shaped. With this shape, the planar portion 72a and the light guiding body 71 forms a step in the light emission direction L so that the predetermined clearance D can be provided between the incident surface 71a of the light guiding body 71 and a face 72a1 (on the right in FIG. 9B) of the planar portion 72a on the side of the LED 61 (hereinafter "LED-side face 72a1"). Accordingly, even when the light guide 70 is attached to the LED board 60, the LEDs 61 can be disposed inside the clearance D as shown in FIG. 7B.

It is to be noted that, as shown in FIG. 7B, the length in the light emission direction L of the clearance D is designed to provide a gap between the irradiation surface 61a of the LED 61 and the incident surface 71a of the light guiding body 71 when the light guide 70 is attached to the LED board 60. With the gap between the irradiation surface 61a of the LED 61 and the incident surface 71a of the light guiding body 71, damage to the LEDs 61 or the light guiding body 71 resulting from the contact therebetween can be prevented even if there are dimensional deviations in the LED 61 or the light guiding body 71.

Additionally, as shown in FIG. 9A, the cutouts 72c are formed in the supporting pieces 72 corresponding to the second jointing portions 74. Specifically, in the supporting piece 72 at either end in the main scanning direction Y1, the cutout 72c is formed on the outer side of the support portion 72b, and, in each of other three supporting pieces 72, the cutout 72c is disposed between the pair of support portions 72b. Referring to FIGS. 4, 6, and 7B, the third jointing portion 84 of the cover 80 is fitted in each cutout 72c as shown in FIG. 7B when the document illuminating device 50 is mounted on the first carriage 25.

Additionally, as shown in FIGS. 9B and 10, side walls 72d are formed on both end portions of the light guiding body 71 in the main scanning direction Y1. It is to be noted that FIG. 10 is an enlarged plan view of the light guide 70. Specifically, the light guiding body 71 is cantilevered by the supporting piece 72, and the side walls 72d are provided to prevent the light guiding body 71 from falling in the direction indicated by arrow M shown in FIG. 9B during, for example, transportation of the apparatus or movement of the first carriage 25 (shown in FIG. 2). The relative positions of the irradiation surface 61a of the LED 61 and the incident surface 71a of the light guiding body 71 can be kept properly because the side walls 72d can prevent the light guiding body 71 from falling.

Figure 12A:
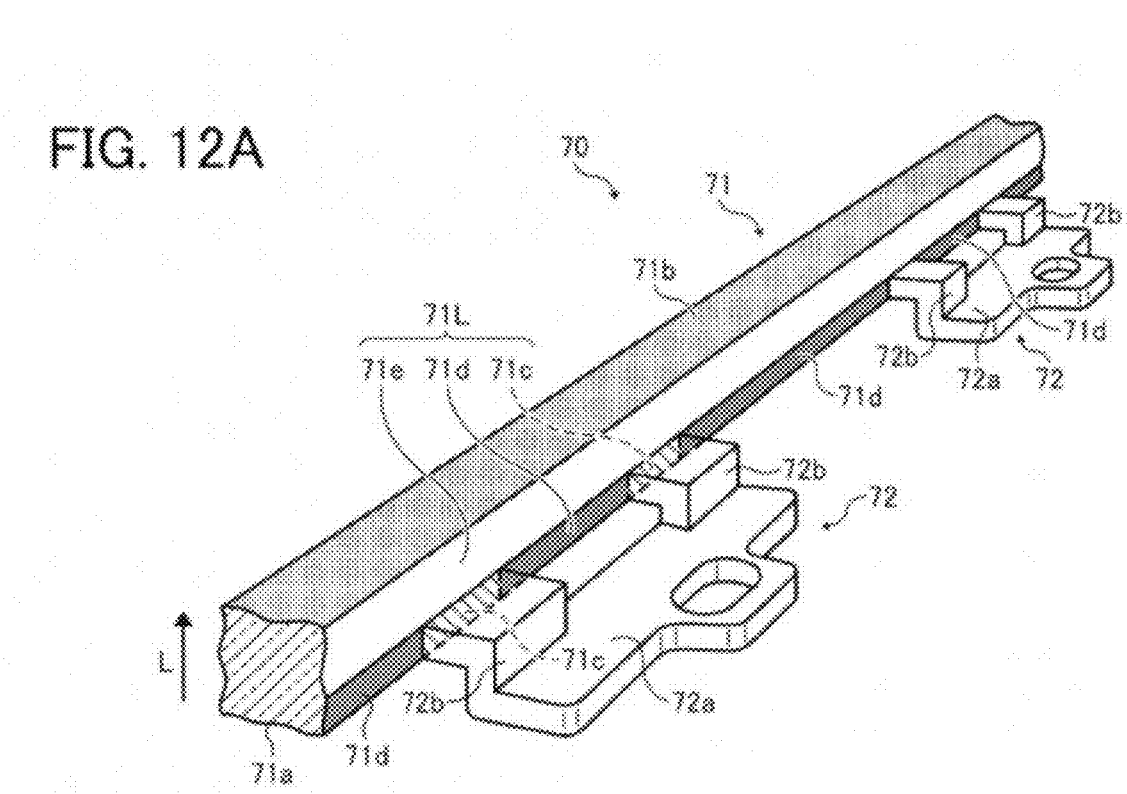
FIG. 12A an enlarged perspective view of the light guide.
Figure 12B:
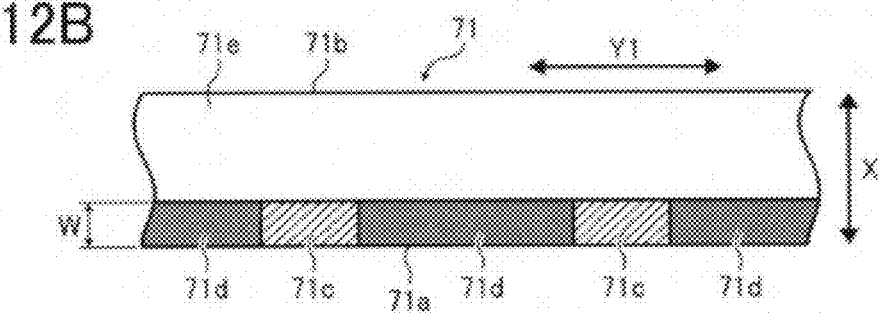
FIG. 12B is an enlarged side view of the light guide with support portions omitted therefrom.

Next, a light transmission range of the light guiding body 71 is described below with reference to FIGS. 11 through 14. FIG. 12A is an enlarged perspective view of the light guide 70. FIG. 12B is an enlarged side view of the light guide 70 with support portions omitted therefrom.

As shown in FIGS. 11 to 12B, the lower face 71L of the light guiding body 71 includes support ranges 71c in each of which the support portion 72b is formed and light transmission ranges 71d adjacent to the respective support ranges 71c in the main scanning direction Y1.

Specifically, as shown in FIG. 12A, the light transmission range 71d is disposed between the adjacent supporting pieces 72 or between the support portions 72b of an identical supporting piece 72 in the main scanning direction Y1. In the supporting pieces 72 at the ends in the main scanning direction Y1, however, the light transmission range 71d is formed on the outer side of the single support portion 72b in the main scanning direction Y1 as shown in FIG. 11, that is, between the support portion 72b and the side wall 72d (shown in FIG. 10).

Figure 16:
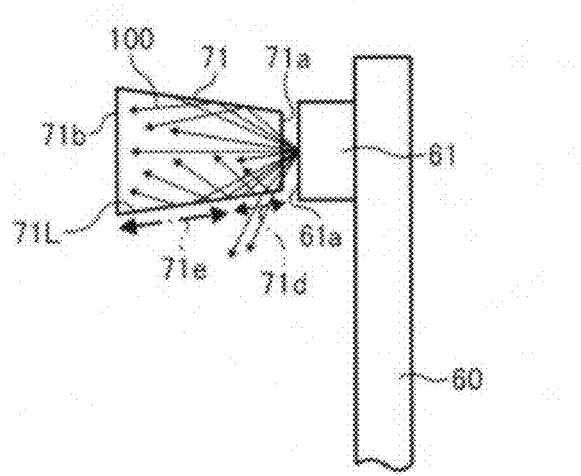
FIG. 16 is a cross sectional view of the light guide along line F-F shown in FIG. 9A and illustrates reflection and transmission of light inside the light guide according to the embodiment.

The light transmission range 71d is formed through surface roughening such as sandblasting or etching. Alternatively, as surface roughening, fine surface irregularities may be created through grain finish. The light transmission range 71d thus roughened can help light that has entered the light guiding body 71 from the LED 61 to partly pass through the light guiding body 71 and exit from the light transmission range 71d as shown in FIG. 16.

As shown in FIG. 12B, the support range 71c and the light transmission range 71d have an identical or similar length (hereinafter "length W") in the direction indicated by arrow X (hereinafter "direction X") shown in FIG. 12B perpendicular to the main scanning direction Y1. The direction X serves as a second direction.

Figure 13:
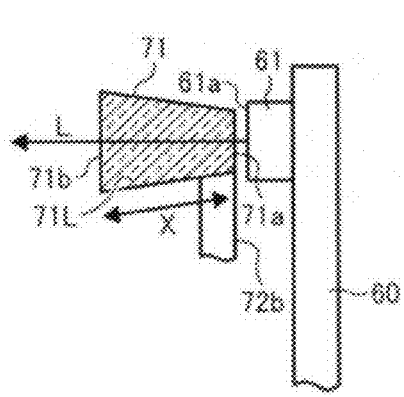
FIG. 13 is a partial cross-sectional view of the light guide.

Referring to FIG. 13, which is a partial cross-sectional view of the light guide 70, the light emission direction L is perpendicular to the irradiation surface 61a of the LED 61 including the main scanning direction Y1. When the light emission direction L is projected onto one of the light transmission ranges 71d, the direction X conforms to the lower surface 71L of the light guiding body 71 in which the light transmission ranges 71d are formed. That is, the direction X parallels the lower surface 71L in which the light transmission ranges 71d are formed.

It is to be noted that the direction X is defined using the light emission direction L being projected onto not the support range 71c but the light transmission range 71d because the direction might be indefinite due to the supporting piece 72 if the light emission direction L is projected onto the support range 71c.

Figure 14B:
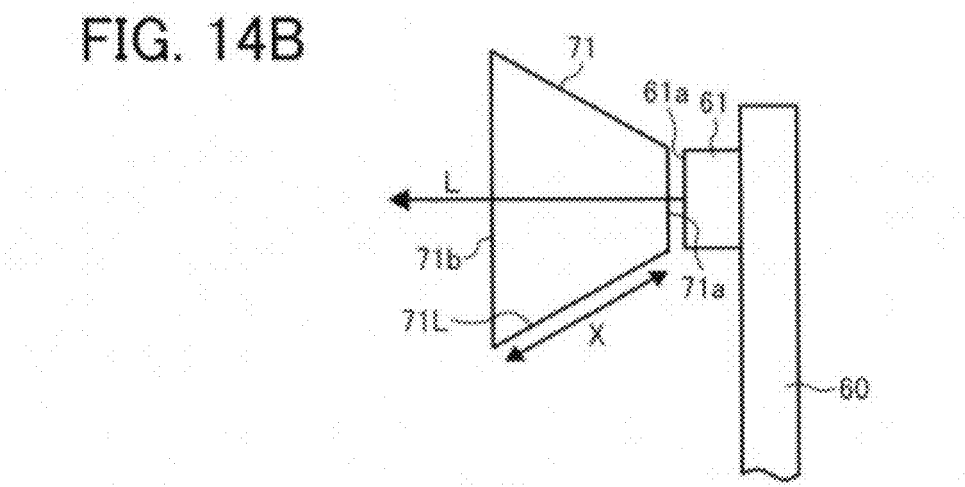
Figure 14C:
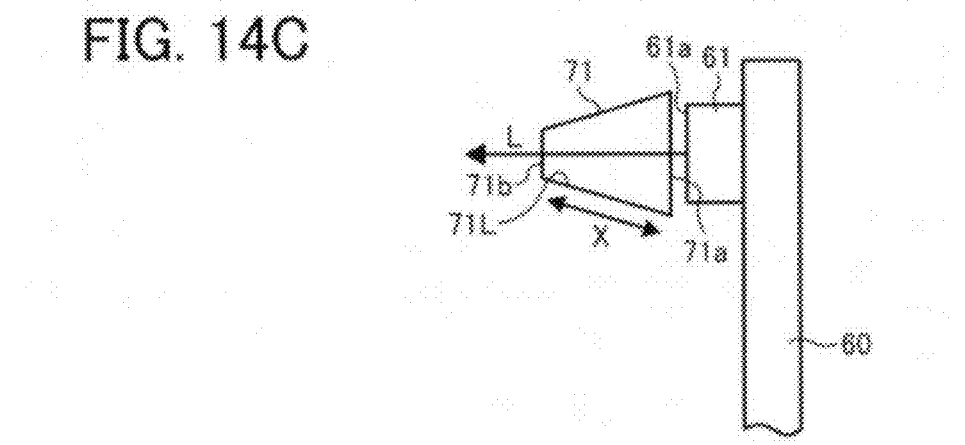

In other words, as shown in FIG. 13, the direction X in the present embodiment parallels the lower surface 71L of the trapezoidal guiding body 71 that is inclined by a predetermined angle relative to the light emission direction L. It is to be noted that, if the light guiding body 71 is shaped like a rectangular parallelepiped as shown in FIG. 14A, the direction X parallels the light emission direction L, and, when the light guiding body 71 is shaped like a trapezoid having a greater inclination, the downward inclination of the direction X increases along the lower surface 71L of the light guiding body 71 as shown in FIG. 14B. Additionally, referring to FIG. 14C, if the light guiding body 71 is a trapezoid such that its vertical length in FIG. 14C decreases toward the light emission surface 71b, the direction X is inclined upward toward the light emission surface 71b. Thus, the direction X (second direction) depends on the shape of the light guiding body 71.

Yet alternatively, the light guiding body 71 may be polygonal in cross section perpendicular to the incident surface 71a and parallel to the light emission direction (L), and either the lower surface 71L or the upper surface, or both of them may be bent and consist of multiple faces. In such cases, the surface in which the support ranges 71c and the light transmission ranges 71d are formed is not necessarily adjacent to the incident surface 71a although the support ranges 71c and the light transmission ranges 71d are formed in the surface adjacent to the incident surface 71a in the configurations shown in the drawings.

FIG. 12B illustrates a cross section created by cutting the support portion 72b at a jointing with the light guiding body 71 along the direction X. In FIG. 12B, the support range 71c corresponds to an area where the support portion 72b is formed when the support portion 72b is cut at the jointing with the light guiding body 71 along the direction X.

On the lower surface 71L of the light guiding body 71, a range 71e except the support range 71c or the light transmission range 71d (hereinafter "internal reflection range 71e") has uniform smooth surface similarly to the upper surface of the light guiding body 71.

Descriptions are given below of reflection and transmission of the light entering the light guiding body 71 in a case in which the light transmission range 71*d* is formed and a comparative example in which no light transmission range 71*d* is formed.

Figure 15A:
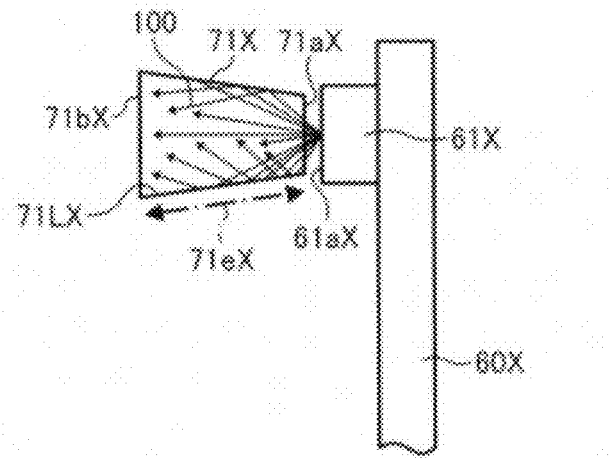
FIG. 15A is a cross sectional view of a light guide without a light transmission range, as a comparative example, along line F-F shown in FIG. 9A.
Figure 15B:
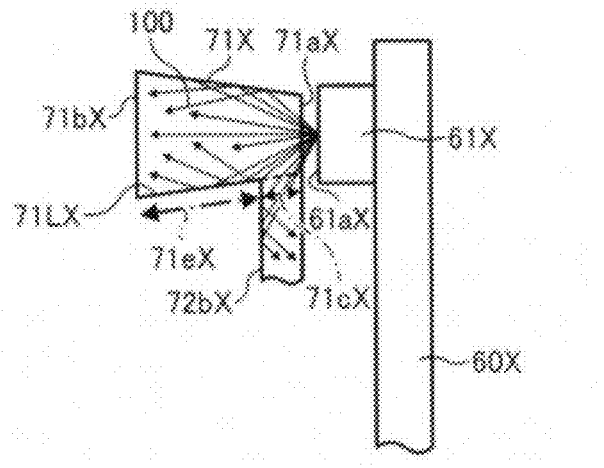
FIG. 15B is a cross sectional view of the comparative light guide along line G-G shown in FIG. 9A.

FIGS. 15A and 15B illustrate, as a comparative example, a guiding body 71X having a lower surface 71LX in which no light transmission range 71*d* is formed. FIG. 15A illustrates a cross section corresponding to an F-F cross section shown in FIG. 9A, and FIG. 15B illustrates a cross section corresponding to a G-G cross section shown in FIG. 9A. FIG. 16 illustrates an F-F cross section of the light guiding body 71, shown in FIG. 9A, that includes the light transmission range 71*d* according to the present embodiment.

It is to be noted that, although suffix "X" is given to reference characters of components shown in FIGS. 15A and 15B to indicate that they are of the comparative example, the configurations thereof are similar to those shown in FIG. 16, and descriptions thereof are omitted.

In the comparative example, the lower surface 71LX consists of support ranges 71*c*X and internal reflection ranges 71*e*X only. In other words, the lower surface 71 LX except the support ranges 71*c*X means the internal reflection range 71*e*X. As shown in FIG. 15A, in the area where the support portion 72*b*X is not formed, light 100 emitted from the LED 61X and entering the light guiding body 71X is totally reflected internally in the internal reflection range 71*e*X and exits from the light emission surface 71*b*X of the light guiding body 71X. Accordingly, in this area, all the light 100 is directed to the irradiation area E (shown in FIG. 4) of the surface of the original.

By contrast, as shown in FIG. 15B, in the area where the support portion 72*b*X is present, the light 100 partly passes through the support range 71*c*X and enters the support portion 72*b*. The light entering the support portion 72*b* is not emitted from the light emission surface 71*b*X and is not directed to the irradiation area E (shown in FIG. 4) of the original. By contrast, the rest of the light 100 that reaches the internal reflection range 71*e*X is totally reflected internally in the internal reflection range 71*e*X. Then, the light is emitted from the light emission surface 71*b*X of the light guiding body 71X and directed to the irradiation area E of the original. Thus, in the area where the support portion 72*b*X is formed, the light 100 is divided into a component that enters the support portion 72*b*X and another component that is emitted from the light emission surface 71*b*X. As a result, in the area where the support portion 72*b*X is formed, the intensity of light emitted from the light emission surface 71*b*X (hereinafter "emission light") is weaker compared with the area where the support portion 72*b*X is not formed.

Therefore, when the lower surface 71L does not include the light transmission range 71*d*, the intensity of light directed to the irradiation area E of the original tends to fluctuate in the main scanning direction Y1.

By contrast, as shown in FIG. 16, the light transmission ranges 71*d* and the internal reflection range 71*e* are provided in the areas of the lower surface 71L of the light guiding body 71 except the areas where the support portions 72*b* are provided in the present embodiment.

Therefore, in the area where the support portion 72*b* is not formed, a part of the light 100 emitted from the LED 61 passes through the light transmission range 71*d* and exits the light guiding body 71. The light thus passing through the light transmission range 71*d* is not emitted from the light emission surface 71*b* and is not directed to the irradiation area E (shown in FIG. 4) of the original. By contrast, the rest of the light 100 that reaches the internal reflection range 71*e* is totally reflected internally in the internal reflection range 71*e*. Then, the light is emitted from the light emission surface 71*b* of the light guiding body 71 and directed to the irradiation area E of the original.

Accordingly, in the present embodiment, the intensity of emission light in the area where the support portion 72*b* is not formed can be reduced from that in the comparative example shown in FIG. 15A, and the intensity of emission light in that area can be similar to that in the area where the support portion 72*b* is provided (shown in FIG. 15A). In the present embodiment, the intensity as well as behavior of the emission light can be similar to that in the area where the support portion 72*b* is provided because the light transmission range 71*d* is close to the irradiation surface 61*a* of the LED 61 similarly to the support range 71*c*.

It is to be noted that, in the light guiding body 71 according to the present embodiment, the configuration of the area where the support portion 72*b* is formed is similar to that of the example shown in FIG. 15B. Therefore, in the area where the support portion 72*b* is formed, the light 100 is divided into a component that enters the support portion 72*b* and another component that is emitted from the light emission surface 71*b*.

As described above, the intensity and behavior of the light can be kept similar between the area where the support portion 72*b* is formed and the area where the support portion 72*b* is not formed. This aspect of the present embodiment can reduce unevenness in the main scanning direction Y1 in the distribution of intensity of the light directed to the irradiation area E of the original.

Next, the cover 80 is described below.

As shown in FIGS. 6 and 7B, the cover 80 is positioned downstream from the LED board 60 as well as the light guide 70 in the light emission direction L to cover the LED board 60 and the light guide 70 from the front side (on the left in FIG. 7B) in the light emission direction L. Specifically, referring to FIGS. 17A and 17B, the cover 80 is constructed of a material having a high optical density and capable of inhibiting transmission of light. For example, polyester film or polyethylene terephthalate (PET) including black carbon may be used. The cover 80 can prevent or inhibit leakage of light emitted from the LEDs 61.

Additionally, the cover 80 may have a black surface having a relatively low reflection rate so that the light emitted from the light guiding body 71 (shown in FIG. 7B) and reflected from the surface of the original can be prevented from being further reflected by the surface of the cover 80 toward the irradiation area E, which is a phenomenon so-called progress of flare light. It is to be noted that, instead of blackening the surface of the cover 80, the surface of the cover 80 may be processed otherwise for inhibiting progress of flare light. For example, it can be roughened or coated with a reflection prevention agent. Thus, the cover 80 has two capabilities: inhibition of leakage of light and restriction of progress of flare light. With the cover 80 having multiple capabilities, the number of components can be reduced, thus reducing the cost and the size of the document illuminating device 50.

Figure 17A:
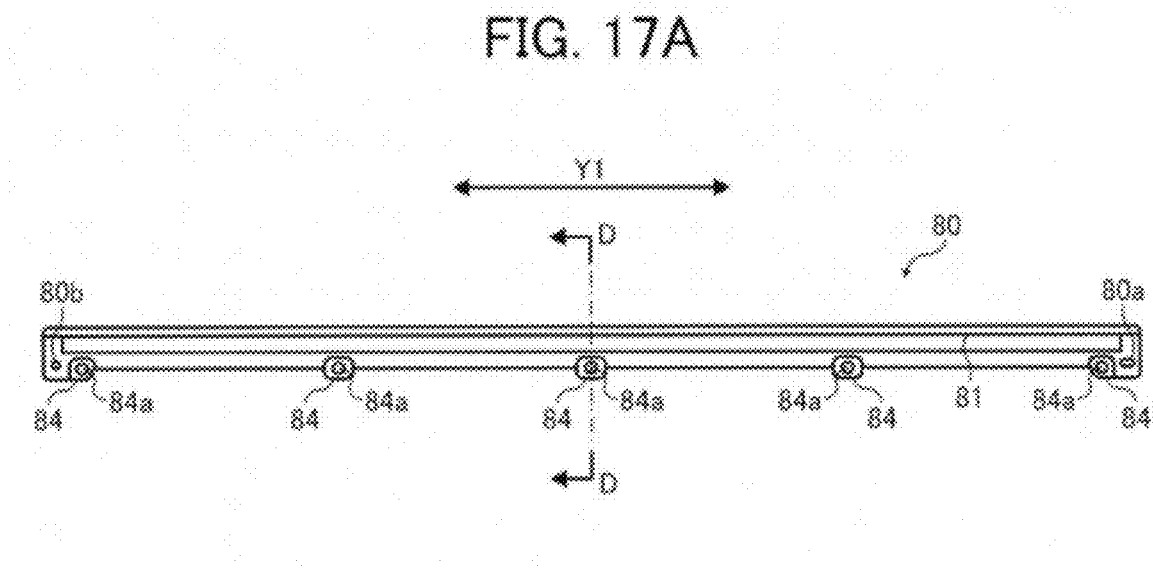
FIG. 17A is a front view of a cover that covers the LED board as well as the light guide as viewed from the front side in the direction in which the LED emits light.
Figure 17B:
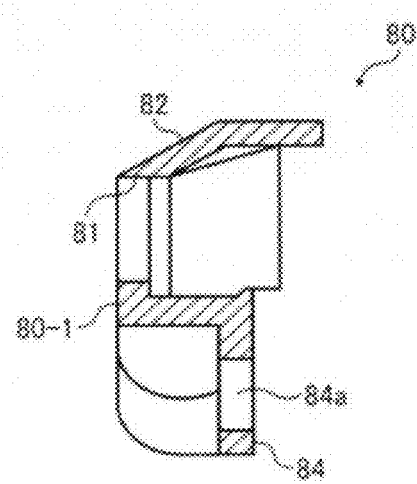
FIG. 17B illustrates a cross section along line D-D shown in FIG. 17A.

Additionally, the opening 81 is formed in the cover 80 as shown in FIG. 7B so that the light emission surface 71*b* of the light guiding body 71 can be exposed when the LED board 60, the light guide 70, and the cover 80 are assembled together. Referring to FIG. 17A, the opening 81 extends in the main scanning direction Y1 in accordance with the length of the light guiding body 71 (shown in FIG. 6) in that direction. However, the area of the opening 81 is slightly greater than the area of the light emission surface 71*b* of the light guiding body 71. Accordingly, a predetermined clearance is provided between the light guiding body 71 and the opening 81. It is to be noted that a predetermined clearance is provided between the light guiding body 71 and the cover 80 also in other areas than the opening 81. Disposing the light guiding body 71 contactless not to contact any component, not limited to the cover 80, is advantageous in that the light totally reflected internally inside the light guiding body 71 can be prevented from being absorbed in components in contact with the light guiding body 71.

The cover 80 further includes the inclined surface 82 inclined relative to the front surface 80-1 (on the left in FIGS. 7B and 17B) in which the opening 81 is formed. Specifically, the inclined surface 82 is inclined by such an angle that the inclined surface 82 parallels the exposure glass 8 (shown in FIG. 4) when the document illuminating device 50 is mounted in the first carriage 25. With this arrangement, the cover 80 does not contact the exposure glass 8 even when the document illuminating device 50 is brought close to the cover 80.

Further, as shown in FIG. 17A, five third jointing portions 84 are provided to a lower end portion of the cover 80, that is, beneath the opening 81. The third jointing portions 84 are spaced at substantially regular intervals in the main scanning direction Y1. A part of each third jointing portion 84 projects downward from a lower end of the cover 80. As shown in FIG. 6, the third jointing portions 84 are positioned to overlap with the respective first jointing portions 64 and the respective second jointing portions 74 in the light emission direction L.

Additionally, as shown in FIG. 17A, each third jointing portion 84 is recessed from the front surface 80-1 toward the light guide 70 (to the right in FIG. 17B) and planar to achieve surface contact not point contact between the third jointing portion 84 and the second jointing portion 74 of the light guide 70. When the LED board 60, the light guide 70, and the cover 80 are assemble into the document illuminating device 50, the third jointing portion 84 engages the cutout 72c of the light guide 70 as shown in FIG. 7B. Thus, the third jointing portions 84 can be in contact with the respective second jointing portions 74 within a limited space.

Additionally, a fastening hole 84a into which the screw 46 is inserted is formed in each third jointing portion 84 as shown in FIG. 17A. The fastening holes 84a are positioned so that their center positions are aligned with the respective virtual lines S shown in FIG. 6.

Additionally, positioning holes 80a and 80b are formed in the respective end portions of the cover 80 in the main scanning direction Y1. In assembling of the document illuminating device 50, the positioning holes 80a and 80b are fitted around the projections of the assembly jig to determine the position of the cover 80 relative to the LED board 60 as well as the light guide 70 attached to the assembling jig. Naturally, each fastening hole 84a is aligned with the corresponding fastening hole 64a of the LED board 60 and the fastening hole 74a of the light guide 70 when the position of the cover 80 is set by the assembling jig.

Next, assembling of the document illuminating device 50 is described below with reference to FIGS. 6 and 7B.

Referring to FIG. 6, initially the two projections of the assembling jig are inserted into the positioning holes 60a and 60b of the LED board 60, respectively, thus determining the position of the LED board 60 with the assembling jig. Then, into the positioning holes 70a and 70b of the light guide 70, the two projections of the assembling jig engaging the positioning holes 60a and 60b of the LED board 60 are inserted. Thus, the position of the light guide 70 relative to the LED board 60 is determined. Subsequently, into the positioning holes 80a and 80b of the cover 80, the two projections of the assembling jig engaging the positioning holes 60a and 60b and the positioning holes 70a and 70b are further inserted. Thus, the position of the cover 80 relative to the light guide 70 and the LED board 60 is determined. That is, relative positions of the LED board 60, the light guide 70, and the cover 80 are determined with the supporting piece 72 of the light guide 70 interposed between the LED board 60 and the cover 80.

In this state, the first jointing portions 64, the second jointing portions 74, and the third jointing portions 84 are connected together with the common screws 64. Specifically, the screw 46 is inserted in the fastening holes 64a, 74a, and 84a, thereby uniting the LED board 60, the light guide 70, and the cover 80 together and fixing their relative positions. Thus, the LED board 60, the light guide 70, and the cover 80 are assembled into the document illuminating device 50 with their relative positions fixed by the screws 46. Subsequently, the screws 46 are inserted in the respective screw holes 42c of the receiving table 42 to fix the assembled document illuminating device 50 to the receiving table 42. Thus, mounting of the document illuminating device 50 is completed. With this configuration, all of the LED board 60, the light guide 70, and the cover 80 can be attached to the receiving table 42 at a time, and work efficiency is increased.

Alternatively, the document illuminating device 50 may be assembled as follows. For example, the fastening holes 64a of the LED board 60 may be used as screw holes into which the screws 46 are screwed. Then, in the state in which the relative positions of the LED board 60, the light guide 70, and the cover 80 are determined with the assembling jig, the screws 46 may be inserted through the fastening holes 74a and 84a to be screwed in the fastening holes 64a.

It is to be noted that, although the assembling jig is used in the above-described embodiment, it is not a requisite for assembling and alignment of the LED board 60, the light guide 70, and the cover 80. For example, positioning pins may be provided to the receiving table 42 (shown in FIG. 4) so that the positioning pins can be directly inserted into the positioning holes 60a, 60b, 70a, 70b, 80a, and 80b. This configuration can eliminate the process of moving the document illuminating device 50 to the receiving table 42 after it is assembled using the assembling jig, making the assembling work simpler.

Next, image reading in the image forming apparatus 1 shown in FIG. 1 is described below.

Referring to FIGS. 2 and 7B, while the first and second carriages 25 and 26 move in the sub-scanning direction Y2 (lateral direction in FIG. 2), light emitted from the LEDs 61 is directed through the light guiding body 71 to the original placed on the exposure glass 8. At that time, as indicated by broken lines shown in FIG. 4, while there is the light emitted from the light guiding body 71 and is directly directed to the irradiation area E of the surface of the original, a part of the light emitted from the light guiding body 71 is reflected by the reflector 44 to the irradiation area E of the original. As a result, the original is irradiated in the irradiation area E.

Subsequently, as indicated by bold broken lines shown in FIG. 4, the light reflected from the original is further reflected by the first mirror 25a to the second mirror 26a (shown in FIG. 2). The reflected light is folded back by the second and third mirrors 26a and 26b sequentially and enters the imaging lens 27. The reflected light is condensed and imaged by the imaging lens 27 on the imaging device 28 disposed on a focal plane. Then, the imaging device 28 generates analogue signals through photoelectric conversion of the optical image of the reflected light. When the first and second carriages 25 and 26 reach the respective positions indicated by broken lines shown in FIG. 2, image reading of the original is completed, and the first and second carriages 25 and 26 are returned to the original positions indicated by solid lines shown in FIG. 2. To move the first and second carriages 25 and 26 back to the original positions, the first and second carriages 25 and 26 can be moved at a velocity faster than that for image reading to enhance productivity in reading image data of originals.

It is to be noted that the image forming apparatus 1 can further include an analogue to digital (A/D) converter to convert analogue signals output from the imaging device 28 into digital image signals and a circuit board in which image processing circuits are implemented to execute various types of image processing such as binarization, multi-value convention, gradation processing, magnification, reduction, or image editing.

As described above, the light guide 70 according to the present embodiment includes the light guiding body 71 and the support portion 72b. As shown in FIGS. 11 and 12B, the light guiding body 71 includes the support ranges 71c in each of which the support portion 72b is formed and the light transmission ranges 71d adjacent to the support range 71c in the main scanning direction Y1. As shown in FIG. 12B, the support range 71c and the light transmission range 71d have an identical or similar length W in the direction X (second direction) perpendicular to the main scanning direction Y1 (first direction). Therefore, the intensity of light can be kept similar between the area where the support portion 72b is formed and the area where the support portion 72b is not formed. Additionally, the intensity as well as behavior of the emission light can be similar regardless of the presence of the support portion 72b because the light transmission range 71d is close to the irradiation surface 61a of the LED 61 similarly to the support range 71c.

Consequently, unevenness in the main scanning direction in the distribution of intensity of the light directed to the irradiation area E of the original can be reduced.

It is to be noted that, although the light transmission ranges 71d are formed through surface roughening in the description above, the light transmission range 71d may be formed otherwise as long as internal reflection of light can be inhibited. For example, color having a lower reflection rate, such as black, than that of the inner face (e.g., internal reflection range 71e) of the guiding body 71, may be used. Specifically, the light transmission range 71d may be painted with such a color paint that can reduce the reflection rate from that of the internal reflection range 71e relative to the wavelength of the light emitted from the LEDs 61.

Additionally, although the number of the first, second, and third jointing portions 64, 74, and 84 is five in the description above, the number of these jointing portions is not limited thereto but depends on variable factors such as the length in the main scanning direction of the document illuminating device 50 or materials of the respective components. Additionally, it is not necessary to space these jointing portions at regular intervals in the main scanning direction. Alternatively, the interval may be either reduced or increased toward the center in the main scanning direction depending on the length in the main scanning direction of the document illuminating device 50 or materials of the respective components.

Additionally, the arrangement of LEDs 61 is not limited to that shown in FIG. 8A. Alternatively, the LEDs 61 may be disposed in multiple arrays in the vertical direction in FIG. 8A, and the upper array of LEDs 61 and the lower array of LEDs 61 may be either aligned with or shifted from each other. Further, instead of top-view type LEDs, side-view type LEDs having a side irradiation surface may be used. In such a case, the shape of the light guide 70 is changed so that the incident surface 71a faces the side irradiation surface of the side-view type LED and the direction of the light emission surface 71b is changed.

Thus, even in the configuration in which the light guide 70 includes support portions 71c to attach the light guide 70 to the light source board 60, the distribution of light directed to the irradiation area E of the original can be prevented or inhibited from fluctuating.

Numerous additional modifications and variations are possible in light of the above teachings. It is therefore to be understood that, within the scope of the appended claims, the disclosure of this patent specification may be practiced otherwise than as specifically described herein.

What is claimed is:

1. A light guide for guiding light to an irradiation range from multiple point sources arranged in a first direction (Y1) and held by a light source board, the light guide comprising:
    a supporting unit including multiple supporting pieces provided to the light source board, the multiple supporting pieces arranged at regular intervals in the first direction (Y1); and
    a light guiding body continuous with and supported by the multiple supporting pieces, the light guiding body disposed downstream from the multiple point sources in a light emission direction (L) of the multiple point sources, the light guiding body including:
        an incident surface disposed facing irradiation surfaces of the multiple point sources;
        a light emission surface from which the light is directed to the irradiation range;
        multiple support ranges in which the multiple supporting pieces are provided; and
        multiple light transmission ranges to cause the light emitted from the multiple point sources to exit the guiding body partly, the multiple light transmission ranges each adjacent to a respective one of the multiple support ranges in the first direction (Y1),
    wherein the multiple support ranges and the multiple light transmission ranges have substantially the same length in a second direction (X) perpendicular to the first direction (Y1).

2. The light guide according to claim 1, wherein the multiple light transmission ranges are formed in a surface of the light guiding body different from the incident surface and the light emission surface of the light guiding body, and
    the second direction (X) parallels the surface of the light guiding body in which the multiple light transmission ranges are formed.

3. The light guide according to claim 2, wherein the surface of the light guiding body in which the multiple light transmission ranges are formed is adjacent to the incident surface of the light guiding body.

4. The light guide according to claim 1, wherein the light transmission range has a roughened surface.

5. The light guide according to claim 1, wherein the light transmission range is colored in a color having a lower reflection rate than that of an inner face of the light guiding body.

6. The light guide according to claim 1, wherein the light guiding body is trapezoidal in cross section perpendicular to the incident surface and parallel to the light emission direction (L).

7. A document illuminating device to illuminate an original, the document illuminating device comprising:
    multiple point sources arranged in a first direction (Y1);
    a light source board to hold the multiple point sources; and
    a light guide for guiding light emitted from multiple point sources toward an irradiation range of the original, the light guide comprising:

a supporting unit including multiple supporting pieces provided to the light source board, the multiple supporting pieces arranged at regular intervals in the first direction (Y1); and a light guiding body continuous with and supported by the multiple supporting pieces, the light guiding body disposed downstream from the multiple point sources in a light emission direction (L) of the multiple point sources, the light guiding body including:

an incident surface disposed facing irradiation surfaces of the multiple point sources;

a light emission surface from which the light is directed to the irradiation range of the original;

multiple support ranges in which the multiple supporting pieces are provided; and multiple light transmission ranges to cause the light emitted from the multiple point sources to exit the guiding body partly, the multiple light transmission ranges each adjacent to a respective one of the multiple support ranges in the first direction (Y1), wherein the multiple support ranges and the multiple light transmission ranges have substantially the same length in a second direction (X) perpendicular to the first direction (Y1).

8. An image reading device comprising:

the document illuminating device according to claim 7; and an image reading unit to receive light reflected from the original and read image data of the original.

9. An image forming apparatus comprising:

the image reading device according to claim 8; and an image forming unit to form an image on a recording medium according to the image data acquired by the image reading device.

\* \* \* \* \*